(12) United States Patent
Suzuki et al.

(10) Patent No.: US 6,959,359 B1
(45) Date of Patent: Oct. 25, 2005

(54) SOFTWARE PREFETCH SYSTEM AND METHOD FOR CONCURRENTLY OVERRIDING DATA PREFETCHED INTO MULTIPLE LEVELS OF CACHE

(75) Inventors: Hiroyoshi Suzuki, Numazu (JP); Minoru Iwami, Chigasaki (JP); Hiroyuki Matsumura, Naka (JP); Dai Taninaka, Odawara (JP)

(73) Assignees: Hitachi, Ltd., Tokyo (JP); Hitachi Computer Peripherals Co., Ltd., Ashigarakamigun (JP)

( * ) Notice: Subject to any disclaimer, the term of this patent is extended or adjusted under 35 U.S.C. 154(b) by 639 days.

(21) Appl. No.: 09/591,104

(22) Filed: Jun. 9, 2000

(30) Foreign Application Priority Data

Jul. 14, 1999 (JP) .............................. P11-199762

(51) Int. Cl.[7] .............................................. G06F 12/06
(52) U.S. Cl. ...................... 711/112; 711/154; 710/100; 713/2
(58) Field of Search ........................ 711/112, 113, 114, 711/154, 126, 170, 71; 709/321; 707/205; 710/5, 100, 51; 713/1, 2

(56) References Cited

U.S. PATENT DOCUMENTS

| | | | | |
|---|---|---|---|---|
| 5,257,367 A | * | 10/1993 | Goodlander et al. | 711/117 |
| 5,394,532 A | * | 2/1995 | Belsan | 711/114 |
| 5,465,343 A | * | 11/1995 | Henson et al. | 711/112 |
| 5,594,885 A | * | 1/1997 | Lautzenheiser | 711/133 |
| 5,742,933 A | * | 4/1998 | Kojima et al. | 711/113 |
| 5,875,349 A | * | 2/1999 | Cornaby et al. | 710/5 |
| 5,909,691 A | * | 6/1999 | Schultz et al. | 711/4 |
| 5,930,481 A | * | 7/1999 | Benhase et al. | 711/112 |
| 6,389,432 B1 | * | 5/2002 | Pothapragada et al. | 707/205 |
| 6,393,492 B1 | * | 5/2002 | Cornaby et al. | 709/321 |
| 6,408,369 B1 | * | 6/2002 | Garrett et al. | 711/165 |
| 6,449,697 B1 | * | 9/2002 | Beardsley et al. | 711/137 |
| 6,473,829 B1 | * | 10/2002 | Dahman et al. | 711/112 |
| 6,606,715 B1 | * | 8/2003 | Kikuchi | 711/113 |
| 6,748,457 B2 | * | 6/2004 | Fallon et al. | 711/112 |

FOREIGN PATENT DOCUMENTS

| | | | | |
|---|---|---|---|---|
| EP | 0 550 853 A2 | * | 7/1993 | ........... G06F 11/20 |
| JP | 05189307 | | 7/1993 | |
| JP | 06124239 | | 5/1994 | |
| JP | 07287669 | | 10/1995 | |
| JP | 10161932 | | 6/1998 | |
| JP | 2000200156 | * | 7/2000 | ........... G06F 12/08 |
| WO | WO 01/22221 A1 | * | 3/2001 | ........... G06F 9/455 |

OTHER PUBLICATIONS

"I/O Subsystem Special Interception Condition" IBM technical Disclosure Buletin, Apr. 1990, vol. 32, Issue 11, page(s) 70-75.*

* cited by examiner

*Primary Examiner*—Pierre-Michel Bataille
(74) *Attorney, Agent, or Firm*—Townsend and Townsend and Crew LLP

(57) ABSTRACT

A cache memory control technology by which set residing data/reset residing data in a cache memory can be executed by individual users. In this system, by execution of set residing data and reset residing data commands, user data spread on plural tracks in the cache memory, using an utility program improves the hit rate of the cache memory.

10 Claims, 10 Drawing Sheets

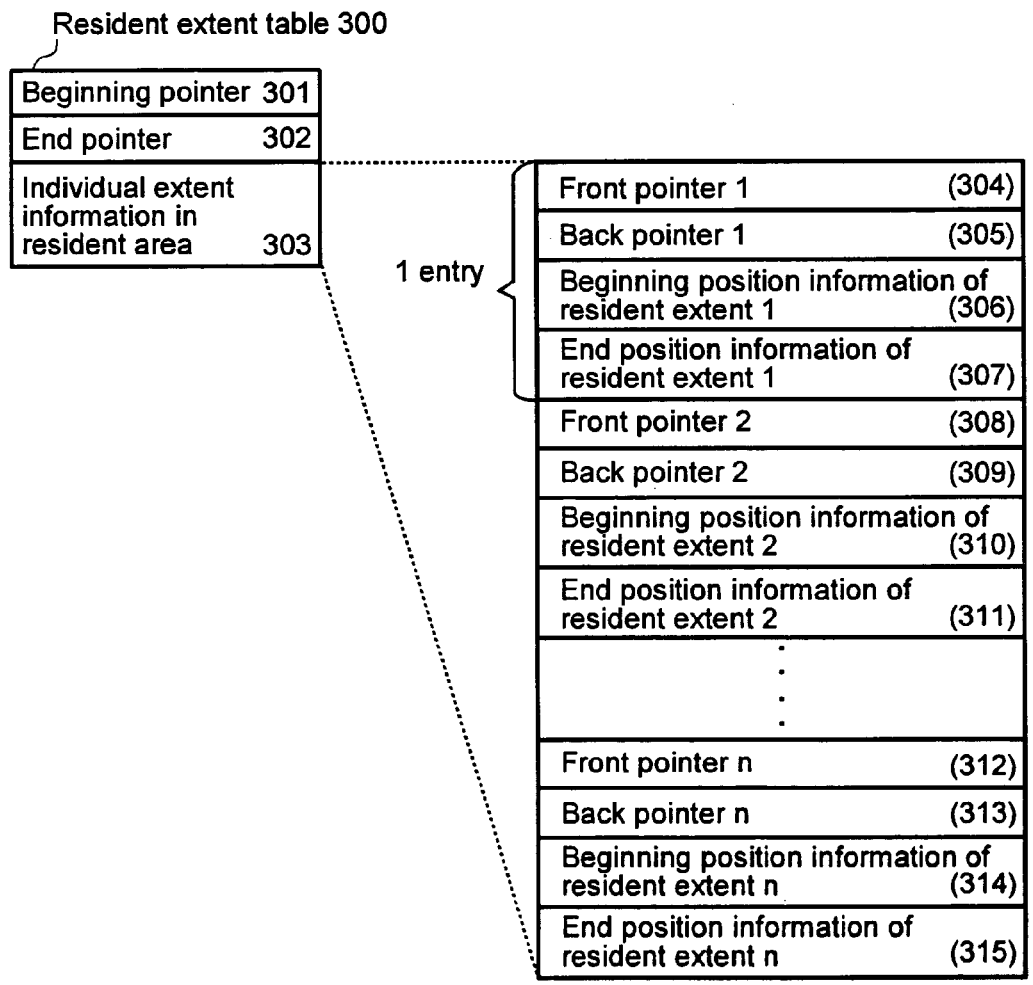

FIG.4

Device proper information table 400

| |
|---|
| Number of resident extent for address #0 (401) |
| Beginning resident extent pointer for address #0 (402) |
| End resident extent pointer for address #0 (403) |
| Number of resident extent for address #1 (404) |
| Beginning resident extent pointer for address #1 (405) |
| End resident extent pointer for address #1 (406) |
| ⋮ |
| Number of resident extent for address #n (407) |
| Beginning resident extent pointer for address #n (408) |
| End resident extent pointer for address #n (409) |

First three rows = 1 entry

SOFTWARE PREFETCH SYSTEM AND METHOD FOR CONCURRENTLY OVERRIDING DATA PREFETCHED INTO MULTIPLE LEVELS OF CACHE

BACKGROUND OF THE INVENTION

1. Field of the Invention

The present invention is related to a cache memory control technology in an external storage subsystem having a cache memory, and more particularly to a cache memory control technology in an external storage subsystem which is shared by plural host units or an information storage system which includes host units.

2. Description of the Prior Art

Information processing systems with increasing performance and scale require external storage subsystems with improved performance. Array type external storage subsystems having large capacity cache memory are now a leading choice of consumers. To increase the performance of such systems, it is important to provide a more efficient control method for the large capacity cache memory. Various methods for control of the large capacity cache memory are described below.

One method uses the frequency of access of data management information in a file system so that frequently used data management information resides on a cache memory, and less frequently used data management information is excluded from the cache memory. Such a system is disclosed in Japanese patent unexamined publication 06-124239.

Another method controls the system by using a caching method based on common algorithms, for example, the least recently used algorithm (LRU). In such systems, the miss-hit rate is examined for each program. If the miss-hit rate is higher than an appointed value, caching is not used in execution of the program after that. Consequently, the caching frequency is reduced correspondingly, and the area of the cache memory consumed by the program is used for another program. This second program presumably has a higher hit rate than the appointed value. Such a system is disclosed in Japanese patent unexamined publication 05-189307.

A method in which an instruction, which enables a program to explicitly designate which data on a main memory is to be placed in a cache memory and provides a control circuit which copies or transfers data from the main memory to the cache memory according to the designation is also known. In this system a circuit which stores the transferred data on the cache memory, and a circuit which cancels storage of the resident data, are provided. A particular program, to be given priority, controls the caching corresponding to characteristics of its processing procedure. As an example of such, see Japanese patent unexamined publication 07-287669.

SUMMARY OF THE INVENTION

In the technology disclosed in the Japanese patent unexamined publication 06-124239, data to be stored in a cache memory is determined according to the access frequency of the data management information in the file system within an appointed time period. Therefore, when an access to data management information having low access frequency is made, user data required is not in the cache memory and time is wasted accessing the target data. Additionally, in the technology disclosed in the Japanese patent unexamined publication 05-189307, the average access time is affected by an appointed value of cache-miss rate. It is difficult to decide on an optimum appointed value.

In the technology disclosed in the Japanese patent unexamined publication 07-287669, considerable hardware is required for a user program to execute a set residing/reset residing instruction for storing the data in a cache memory. A set residing/reset residing instruction refers to an instruction which provides a set of data to a cache memory or removes a set of data from the cache memory. Further, the user program must take account of data resident in the cache memory.

The function of conventional set/reset control of the cache memory is executed by a service processor or a remote console. Therefore, even though the execution of set/reset is possible, it is done by an operator. It is not easy for a user to execute it. Furthermore, it is necessary to input a data address which is the object of the set or reset instruction.

Furthermore, caching in a storage controller ordinarily is executed in a track unit. Storage in the cache memory in a track unit is usually executed according to an LRU algorithm. Therefore, when data on plural tracks is accessed at random, thrashing (cache-misses) can occur because only some data is resident. Thus performance of the information processing system deteriorates.

This invention provides a cache memory control technology in which a user can execute the set/reset to control the data resident in the cache. In addition it provides a cache memory control technology in which the set/reset is executed using a utility program in response to input of a data set name. It also provides a cache memory control technology in which the set/reset function of a cache memory is executed corresponding to an operating state of a host unit based on operating information collected by an external storage subsystem. This enables the performance of the information processing system to be improved. Another benefit of the invention is that it provides a cache memory control technology in which set/reset of user data spread on plural tracks is possible.

To solve the above described problems, in an external storage subsystem having a cache memory to store data temporarily, and having an interface through which the external storage subsystem is connected to a host unit which executes writing and reading data, the setting and resetting of user data residing in the cache memory is executed according to an instruction from the host unit.

Alternatively, in an external storage subsystem having a cache memory to store data temporarily, the residing set of user data in the cache memory or reset thereof of user data from the cache memory is executed based upon user defined information. This information in which user data to reside in the cache memory is defined or executed based on operating information of the external storage subsystem. Further, the set of user data to be stored in the cache memory or the reset thereof of user data from the cache memory is executed in a unit of a data set area.

BRIEF DESCRIPTION OF THE DRAWINGS

FIG. 2 is a diagram illustrating an example of a structure of resident extent parameters for applying dynamic cache control in an embodiment of the invention.

FIG. 3 is a diagram of an example structure of resident extent table for applying dynamic cache control in an embodiment of the invention.

FIG. 4 is a diagram of an example of an information table for applying the dynamic cache control in an embodiment of the invention.

DESCRIPTION OF THE SPECIFIC EMBODIMENTS

Figure 1:
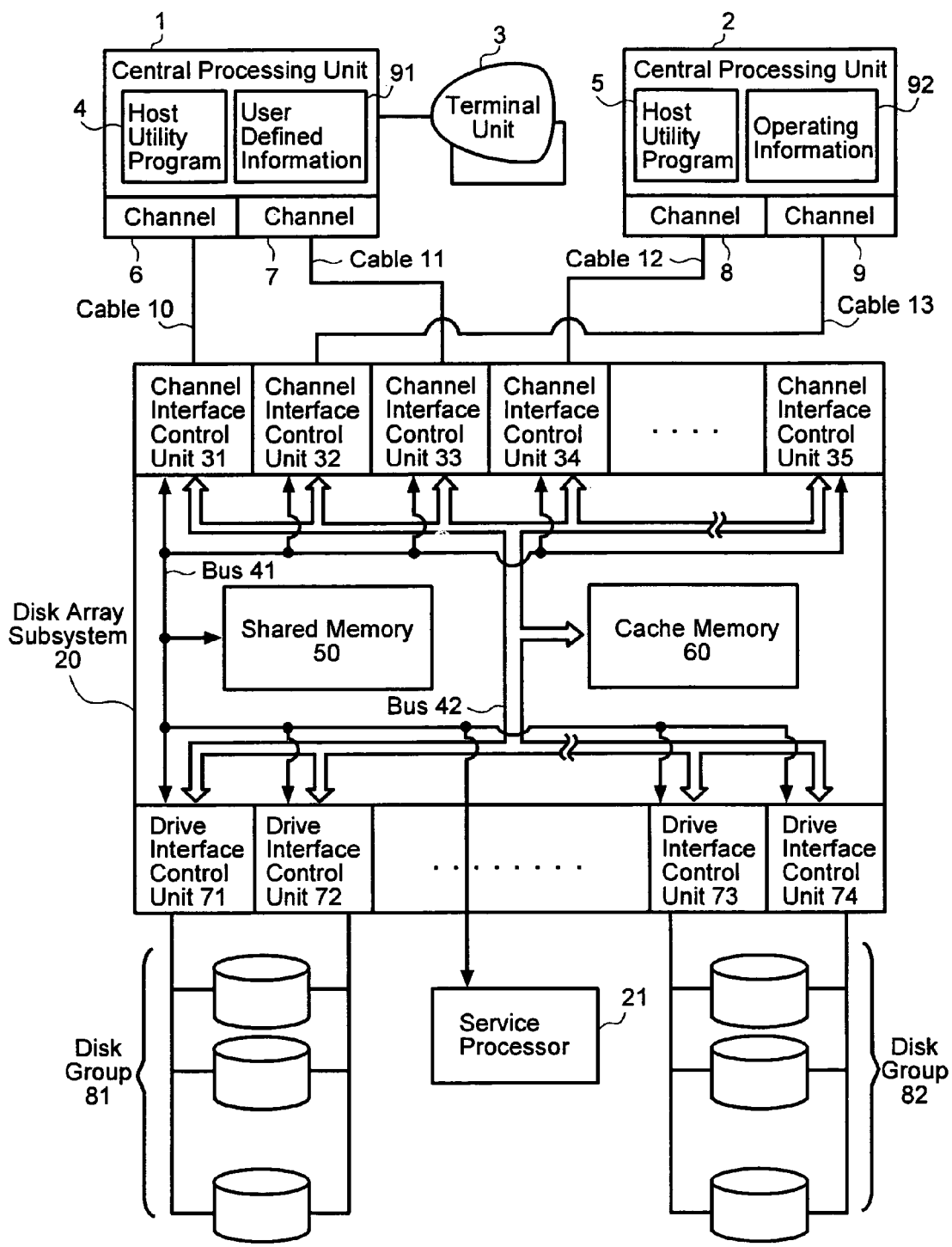
FIG. 1 is a block diagram of an information processing system in one embodiment of the present invention.

FIG. 1 is a block diagram showing an example of a hardware structure of an information processing system. The system includes an external storage subsystem having the dynamic cache control function of an embodiment of the invention. As an example of the external storage subsystem, a disk array subsystem is shown; however, a magnetic disk subsystem with cache memory, an optical disk subsystem with cache memory or a data buffer memory, a flash memory, etc., may be a suitable external storage subsystem to which the present invention is applied.

The disk array subsystem 20 in this embodiment is connected via channels 6 to 9 to a central processing unit (also referred to as a host unit or an upper unit) 1, 2 via communication links such as cables 10 to 13. A service processor 21 in the disk array subsystem 20 sets composition information for the disk array subsystem, writes to the external storage subsystem, writes the composition information to a shared memory 50 through bus 41, collects operating information and error information from the disk array subsystem 20, and generally maintains it. As actual examples of the operating information of the disk array subsystem 20, there are time, physical cylinder and head address, access frequency, device address, the number of read/search bytes, the number of data over run occurrences, and the number of error occurrences, for example, CRC (cyclic redundancy check) errors.

Channel interface control units 31 to 35 process commands from the channels 6 to 9 of the central processing units 1 and 2 via the cables 10 to 13, process data transfer between cache memory 60 and the channels 6 to 9 of the central processing units 1 and 2 by using bus 42, and collect operating information of the disk array subsystem 20. To execute these functions, the channel interface control units 31 to 35 refer/update information in the shared memory 50, communicate with drive interface control units 71 to 74, and communicate with the service processor 21, via bus 41.

Bus 41 is a communication control line which connects the channel interface control units 31 to 35, the shared memory 50, the drive interface control units 71 to 74, and the service processor 21. Bus 41 is used for communication among the channel interface control units 31 to 35, the drive interface control units 71 to 74, and the service processor 21, and for referring/updating between the shared memory 50 and the channel interface control units 31 to 35, the drive interface control units 71 to 74, or the service processor 21.

Bus 42 transfers data from the central processing units 1 and 2 to the cache memory 60 through channels 6 to 9, cables 10 to 13, and the channel interface control units 31 to 35. It transfers data from the cache memory 60 to the central processing units 1 and 2 through the channel interface control units 31 to 35, the cables 10 to 13, and the channels 6 to 9. It also transfers data from the cache memory 60 to disk groups 81 and 82, which comprise plural magnetic disk subsystems, through the drive interface control units 71 to 74, and it transfers data from the disk groups 81 and 82 to the cache memory 60 through the drive interface control units 71 to 74.

Shared memory 50 is a nonvolatile memory which stores information necessary for operation of the channel interface control units 31 to 35, the drive interface control units 71 to 74, etc. This information is used for operation of this embodiment, the composition information from the service processor 21, the operating information of the disk array subsystem 20, etc.

Cache memory 60 is a memory which temporarily stores write data from the central processing units 1 and 2 and read data from the disk groups 81 and 82. The drive interface control units 71 to 74 read data from the disk groups 81 and 82 to the cache memory 60 and write data from the cache memory 60 to the disk groups 81 and 82 by referring/updating information on the shared memory 50 through the bus 41 under control of the channel interface control units 31 to 35.

Disk groups 81 and 82 are disk arrays which store data written in the cache memory 60 by the central processing units 1 and 2. A host utility program 4 executes in the central processing unit 1 based on a user defined information 91. This information is input from a terminal unit 3 by a user. A host utility program 5 executes in the central processing unit 2 based on operating information 92 from an operating system in the central processing unit 2. Specifically, based on the user defined information 91 or the operating information 92, the host utility program 4 or program 5 issues a command and command parameters to the disk array subsystem 20 through the channels 6 to 9 and cables 10 to 13. This controls setting or resetting data in the cache memory 60 in the disk array subsystem 20.

Examples of detailed information entered as user defined information 91, include time, control of set residing/reset residing, data set name, physical cylinder address, head address, volume table of contents (described later), volume name, etc. All such information is not necessary, for example, one may employ a setting in which only the data-set name is an object of a set residing data/reset residing data instruction entered from the terminal 3.

The user defined information 91 may reside in a main memory (not shown), in the central processing unit 1, or in a temporary data-set or permanent data-set in the external storage subsystem. Examples of detailed information of the opening information 92 include time, data-set name, physical cylinder address, head address, volume name, access frequency, device address, average response time, average disconnection time, average connection time, etc.

The operating information 92, which is made and used by the operating system, usually is stored in a permanent data-set in an external storage subsystem of the central processing unit 2. In addition, it is possible for the channel interface control units 31 to 35 examine historical information and send that information to the service processor 21. Then data to be stored can be selected based on that information instead of the operating information 92. When the service processor 21 has enough memory capacity to store detailed information regarding the operating information in an amount nearly equal in capacity to the operating information 92, this information may be used instead of the operating information 92.

FIG. 2 is a conceptual diagram showing an example of command parameters received by the disk array subsystem 20 from the host utility programs 4 and 5 through the channels 6 to 9. This provides a means to realize the dynamic cache storage in the present embodiment. FIG. 2 is further a conceptual diagram showing an example of a structure of the Resident extent parameters 200 received from the host utility program 4 or 5. The received Resident extent parameters 200 are held in the channel interface control units 31 to 35. In the present embodiment, the command to execute the dynamic cache set residing data/reset residing data may be a defined command of which operation is defined among the central processing units 1 and 2, the channels 6 to 9, and the disk array subsystem 20, or may be an undefined command.

Next, more detailed structure of the example of the resident extent parameters 200 is explained. The Resident extent parameters 200 comprises "Resident mode instruction" 201, "Beginning position information of resident extent" 202, and "End position information of resident extent" 203. The Resident mode instruction 201 is a parameter to instruct the system to set residing data and reset residing data in the cache memory 60. The Beginning position information of resident extent 202 indicates the beginning physical position of the data on the disk to be stored in the cache memory 60, namely, the beginning cylinder number and head number. The End position information of resident extent 203 indicates end physical position of the data on the disk to be stored in the cache memory 60, namely, the end cylinder number and head number.

Ordinarily, user data is stored in a data-set under management of the operating system. The operating system manages these data-sets with a Volume table of contents (VTOC). The "Beginning of extent" (BOE) and the "End of extent" (EOE) relate to a domain of the data-set among information written in the VTOC. The BOE indicates the beginning of an extent with cylinder number, track number, sector number, etc. of a direct access volume. EOE records the end of a extent in the same format as the BOE. A domain between BOE and EOE is referred to as a data-set domain. The host utility program 4 reads from the user defined information 91, or the host utility program 5 reads from the operating information 92. The data set name, which is an object of set residing data or reset residing data in the cache memory 60. It thus obtains the BOE and EOE of the data-set from the information written in the VTOC. The host utility programs 4 and 5 make BOE the Beginning position information of resident extent 202 and make EOE the End position information of resident extent 203, then indicate the Resident extent parameters 200 to the disk array subsystem 20.

FIG. 3 is a conceptual diagram showing an example of a structure of Resident extent table 300. This control information is used to realize the dynamic cache control in the present embodiment. The Resident extent table 300 exists in each of the channel interface control units 31 to 35 or on the shared memory 50. The Resident extent table 300 comprises Beginning pointer 301, End pointer 302, and Individual extent information in resident area 303. The Individual extent information in resident area 303 in which one entry comprises Front pointer 1 (304), Back pointer 1 (305), Beginning position information of resident extent 1 (306), and End position information of resident extent 1 (307), has entries of which number is equal to number of resident area.

As shown in FIG. 3, Front pointer 1 (304), Back pointer 1 (305), Beginning position information of resident extent 1 (306), End position information of resident extent 1 (307) are dealt with as a cluster. Front pointer 2 (308), Back pointer 2 (309), Beginning position information of resident extent 2 (310), End position information of resident extent 2 (311), . . . , Front pointer n (312), Back pointer n (313), Beginning position information of resident extent n (314), and End position information of resident extent n (315) are in the Individual extent information in resident area 303. Thus n entries exist, of which number n is equal to the number of resident areas. When a resident area is indicated by the host utility program 4 or 5, the Individual extent information in resident area 303 takes the form of queue structure in which each entry is in a cluster.

In the following to simplify the explanation, when set residing data of a first user data-set is instructed by the host utility program 4 or 5, and when set residing data of a second user data-set is instructed by the host utility program 4 or 5, transition of contents of Beginning pointer 301, End pointer 302, and Individual extent information in resident area 303 in the Resident extent table 300 are explained. The actual value of each pointer; Beginning pointer 301, End pointer 302; Front pointer 1 (304), Front pointer 2 (308), . . . , Front pointer n (312) in Individual extent information in resident area 303; and Back pointer 1 (305), Back pointer 2 (309), . . . , Back pointer n (313) in Individual extent information in resident area 303; usually will be a value in the following list: memory address, displacement address, and entry number from beginning. Further, initial values of the pointers are all not real values (x'FFFF' for example).

When the set residing data of first user data-set is instructed by the host utility program 4 or 5, the transition of contents of Beginning pointer 301, End pointer 302, and Individual extent information in resident area 303 in the Resident extent table 300 are explained. When the set residing data of the first data-set is instructed by the host utility program 4 or 5, the contents of Beginning pointer 301 and End pointer 302 in the Resident extent table 300 are updated to indicate the position of Front pointer 1 (304). At this time, the contents of Front pointer 1 (304) and Back pointer 1 (305) remain as initial values.

Then a value for the Beginning position information of resident extent 202 in the resident extent parameters 200 is put in the Beginning position information of resident extent 1 (306), and a value of the End position information of resident extent 203 in the resident extent parameters 200 is put in the End position information of resident extent 1 (307). Next, when the set residing data of second user data-set is instructed by the host utility program 4 or 5, the transition of contents of Beginning pointer 301, End pointer 302, and Individual extent information in resident area 303 in the Resident extent table 300 is explained. It is assumed that set residing data of the first user data-set is instructed by the host utility program 4 or 5, then set residing data of the second user data-set is instructed by the host utility program 4 or 5.

Further, it is assumed that when the contents of the Resident extent table 300 are in the state described above, set residing data of the second user data-set is instructed by the host utility program 4 or 5. When the set residing data of the second user data-set is instructed by the host utility program 4 or 5, a vacant entry in the Individual extent information in resident area 303 is searched for and the entry is saved.

In this case if an entry of Front pointer 2 (308), Back pointer 2 (309), Beginning position information of resident extent 2 (310), and End position information of resident extent 2 (311) is a vacant entry, the value of the Front pointer of an entry indicated by the End pointer 302 in the present Resident extent table 300, is updated to the value to indicate the position of the Front pointer 2 (308). The value of the Front pointer 1 (304) is updated to a value to indicate the position of the Front pointer 2 (308).

Next, the value of the Back pointer of the kept vacant entry is changed to the value of the End pointer 302 in the present Resident extent table 300. The value of the Back pointer 2 (309) is updated to the value to indicate the position of the Front pointer 1 (304). The value of the Beginning position information of resident extent 202 in the resident extent parameters 200 is put into the Beginning position information of resident extent 2 (310), and the value of the End position information of resident extent 203 in the resident extent parameters 200 is put into the End position information of resident extent 2 (311).

Then, the value of the End pointer 302 in the Resident extent table 300 is changed to the value to indicate the position of the Front pointer of the kept vacant entry. The value of the End pointer 302 in the Resident extent table 300 is updated to the value to indicate the position of the Front pointer 2 (308). At this time, the contents of Back pointer 1 (305) and Front pointer 2 (308) remain as initial value.

FIG. 4 is a conceptual diagram showing an example of a structure of Device proper information table 400 which is control information to execute the dynamic cache residing in the present embodiment. The Device proper information table 400 exists in each of the channel interface control units 31 to 35 or on the shared memory 50.

In the Device proper information table 400 one entry comprises Number of resident extent for address #0 (401), Beginning resident extent pointer for address #0 (402), and End resident extent pointer for address #0 (403). There are entries which number equal to the number of the volume address controlled by the disk array subsystem 20. Namely, as shown in FIG. 4, the Number of resident extent for address #0 (401), Beginning resident extent pointer for address #0 (402), and End resident extent pointer for address #0 (403) are dealt with as a cluster. The Number of resident extent for address #1 (404), Beginning resident extent pointer for address #1 (405), End resident extent pointer for address #1 (406), . . . , Number of resident extent for address #n (407), Beginning resident extent pointer for address #n (408), and End resident extent pointer for address #n (409) are in the Device proper information table 400. Thus n entries exist, where n is equal to the number of the volume addresses controlled by the disk array subsystem 20.

The Number of resident extent for address #m (m=0, 1, . . . , n) shows the number of entries of the concerned volume address in the Individual extent information in resident area 303 in the Resident extent table 300. Beginning resident extent pointer for address #m (m=0, 1, . . . , n) is a pointer which indicates the position of the first entry of the concerned volume address in the Individual extent information in resident area 303 in the Resident extent table 300. End resident extent pointer for address #m (m=0, 1, . . . , n) is a pointer which indicates the position of the last entry of the concerned volume address in the Individual extent information in resident area 303 in the Resident extent table 300.

The actual value of the Beginning resident extent pointer for address #m (m=0, 1, . . . , n) and the End resident extent pointer for address #m (m=0, 1, . . . n) may be any value in the following: memory address, displacement address, or entry number from the beginning. Further, initial values of the pointers are all not real values (x'FFFF' for example).

Using the example described above in which the residence of two user data-sets is executed, transition of the contents of the Device proper information table 400 is explained. To simplify the explanation, a case in which the residence of two data-sets in address #0 volume is executed is explained. Because the transition of the contents of the Resident extent table 300 has been already described, no explanation is repeated. In this case, the contents of the Device proper information table 400 are: the value of the Number of resident extent for address #0 (401) is changed to 2, the value of the Beginning resident extent pointer for address #0 (402) is changed to the value to indicate the position of the Front pointer 1 (304) in the Individual extent information in resident area 303 in the Resident extent table 300, and the value of the End resident extent pointer for address #0 (403) is changed to the value to indicate the position of the Front pointer 2 (308) in the Individual extent information in resident area 303 in the Resident extent table 300.

Referring to FIG. 1 to FIG. 4, an example of processing of the channel interface control units 31 to 35, which is shown on flow charts in FIG. 5 to FIG. 11, is explained. Though the channel interface control units 31 to 35 have three processing functions described above, here, the explanation is focused on the dynamic cache storage control processing.

Figure 5:
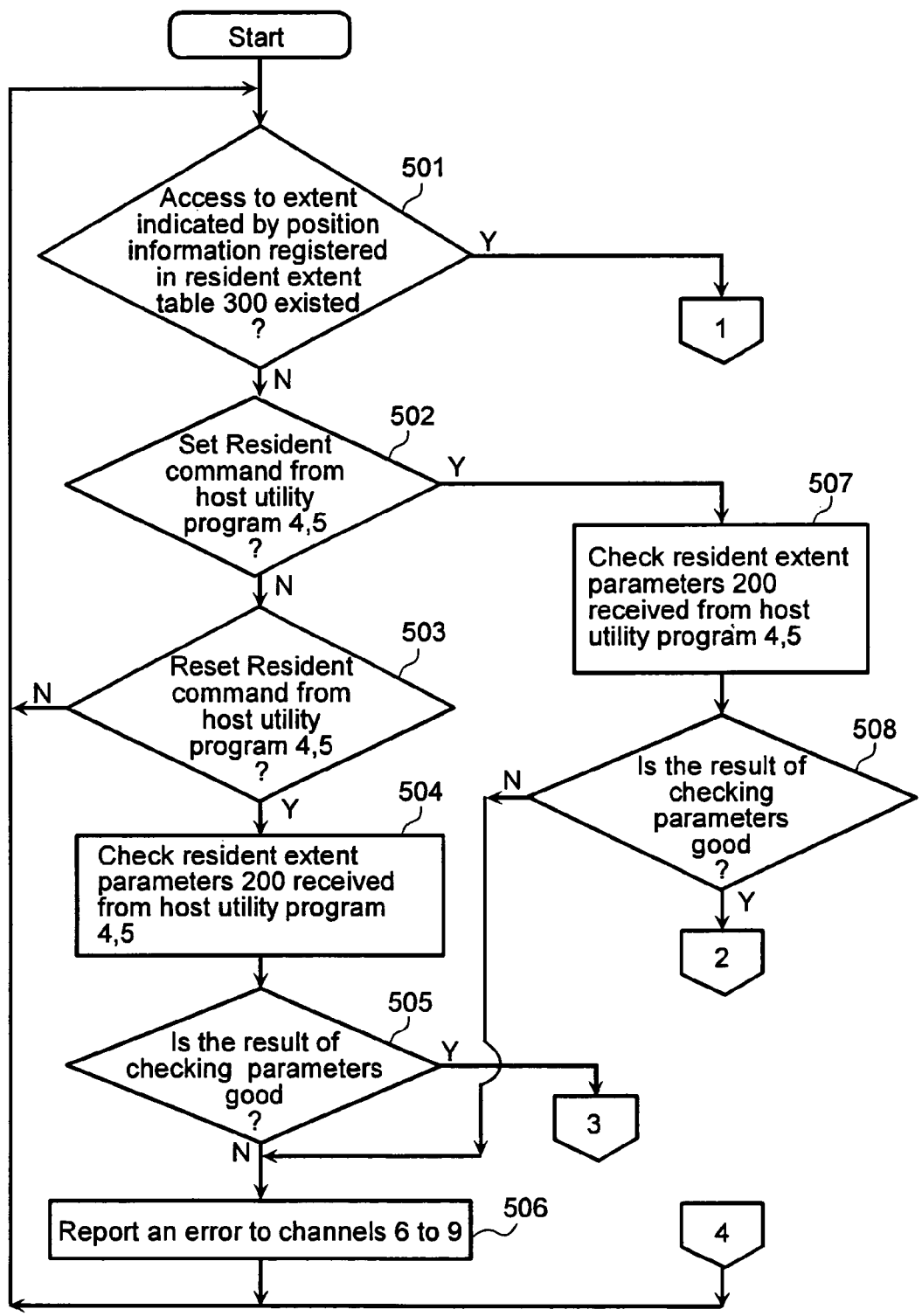
FIG. 5 is an initial flow chart of an example of the operation of the dynamic cache control in an embodiment of the invention.

FIG. 5 is a flow chart. A test is performed at step 501 to determine if an access to extent indicated by position information registered in the Resident extent table 300 exists. Namely, a test is performed to determine if there is an access to any extent as follows: an extent from the Beginning position information of resident extent 1 (306) to the End position information of resident extent 1 (307), an extent from the Beginning position information of resident extent 2 (310) to the End position information of resident extent 2 (311), . . . , an extent from the Beginning position information of resident extent n (314) to the End position information of resident extent n (315) in the Individual extent information in resident area 303 on the Resident extent table 300, which are searched using the Number of resident extent for the address concerned and the Beginning resident extent pointer for the address concerned on the Device proper information table 400. At step 501, if there is an access to the extent indicated by the position information registered in the Resident extent table 300, step 601 (FIG. 6) executed. If there is no access to the extent indicated by the position information registered in the Resident extent table 300, step 502 is executed.

A test is performed at step 502 to determine if the instruction is the set resident instruction from the host utility program 4 or 5. Namely, the Resident mode instruction 201 in the Resident extent parameters 200 is checked. If the contents of the Resident mode instruction 201 in the Resident extent parameters 200 is set residing, step 507 is executed, if the contents of the Resident mode instruction 201 in the Resident extent parameters 200 is not set residing, step 503 is executed.

A test is performed at step 503 to determine if the instruction is the reset resident instruction from host utility program 4 or 5. Namely, the Resident mode instruction 201 in the Resident extent parameters 200 is checked similarly in the step 502. If the contents of the Resident mode instruction 201 in the Resident extent parameters 200 is not reset residing, the processing is returned to step 501, if the contents of the Resident mode instruction 201 in the Resident extent parameters 200 is reset residing, step 504 is executed.

At step 504, the contents of the Resident extent parameters 200 received from the host utility program 4 or 5 are checked. Actually, the validity of the Resident mode instruction 201, Beginning position information of resident extent 202, and End position information of resident extent 203 in the Resident extent parameters 200 is examined.

A test is performed at step 505 to determine if results of the check which has been executed to the contents of the Resident extent parameters 200 at the step 504 are good. If results of the check are good, step 901 (FIG. 9) is executed, and if results of the check are not good, step 506 is executed.

At step 506, the error is reported to the channels 6 to 9.

At step 507, the check being similar to step 504 is executed.

Figure 6:
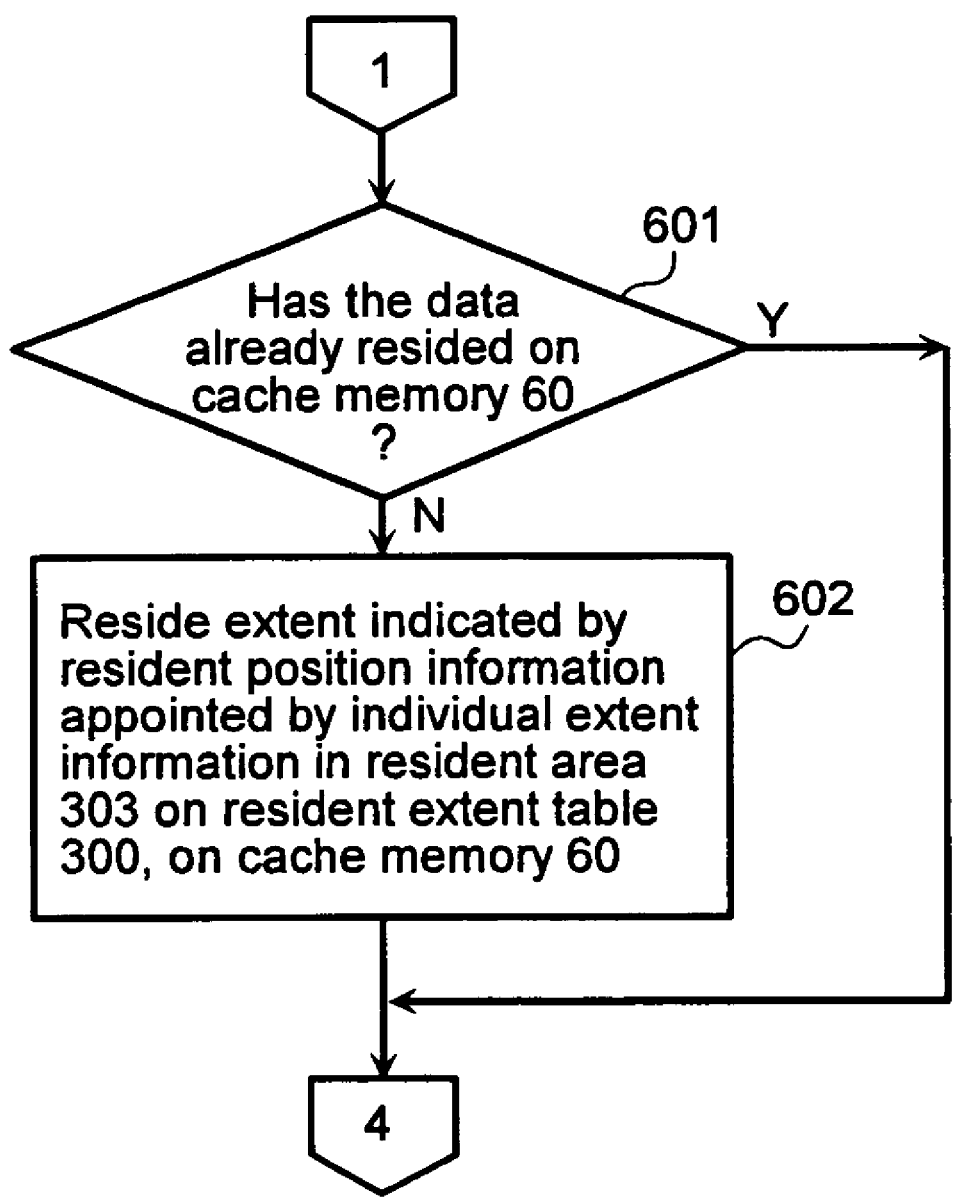
FIGS. 6 to 11 are flow charts coupled to the flow chart of FIG. 5, further illustrating the invention.

At step 508, the processing being similar to step 505 is executed. If results of the check are good, step 701 (FIG. 7) is executed, and if results of the check are not good, step 506 is executed. FIG. 6 shows an example of process flow in case that there is an access to the extent indicated by position information registered in the Resident extent table 300.

A test is performed at step 601 to determine if data has been already stored in the cache memory 60, actually, if the user data-set to be resided has been already stored in the cache memory 60. If the data is stored in the cache memory, the processing is returned to step 501 (FIG. 5). If the data is not stored in the cache memory 60, step 602 is executed.

At step 602, the data in the extent indicated by the resident position information appointed by the Individual extent information in resident area 303 on the Resident extent table 300 (namely, one of the following extents: an extent from the Beginning position information of resident extent 1 (306) to the End position information of resident extent 1 (307), an extent from the Beginning position information of resident extent 2 (310) to the End position information of resident extent 2 (311), . . . , an extent from the Beginning position information of resident extent n (314) to the End position information of resident extent n (315)), is stored in cache memory 60. After this, the processing is returned to step 501 (FIG. 5).

Figure 7:
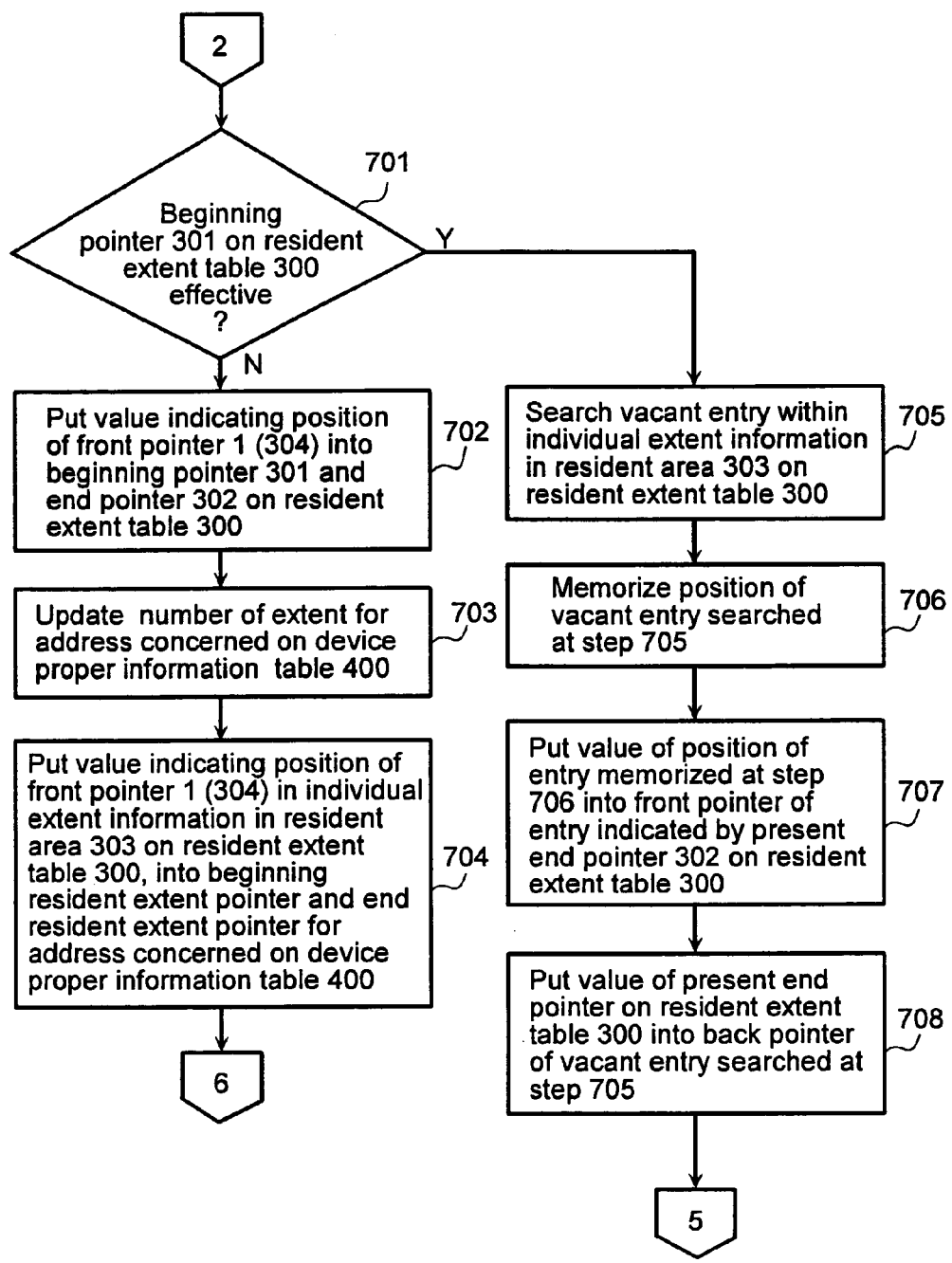

FIG. 7 shows an example of process flow in processing when the set residing instruction is issued from the utility program 4 or 5. A test is performed at step 701 to determine if the Beginning pointer 301 on the Resident extent table 300 is effective. Namely, the test is performed to determine if the Beginning pointer 301 on the Resident extent table 300 is the initial value. That is to say, this step examines if any entry has been registered on the Resident extent table 300. If the Beginning pointer 301 on the Resident extent table 300 is effective (not the initial value), step 705 is executed. If the Beginning pointer 301 on the Resident extent table 300 is not effective (is the initial value), step 702 is executed.

At step 702, the value indicating the position of the Front pointer 1 (304) is put into the Beginning pointer 301 and the End pointer 302 on the Resident extent table 300, and then step 703 is executed. At step 703, the Number of resident extent for the address concerned on the Device proper information table 400 is updated (to "1"), and then step 704 is executed.

At step 704, the value indicating the position of the Front pointer 1 (304) in the Individual extent information in resident area 303 on the Resident extent table 300 is put into the Beginning resident extent pointer and the End resident extent pointer for the address concerned on the Device proper information table 400, and then step 802 (FIG. 8) is executed.

At step 705, a vacant entry within the Individual extent information in resident area 303 on the Resident extent table 300 is searched, and then step 706 is executed. At step 706, the value of the position (pointer) of the vacant entry searched at step 705 is memorized, and then step 707 is executed.

At step 707, the value of the position (pointer) of the entry memorized at step 706 is put into the Front pointer of an entry indicated by the present End pointer 302 on the Resident extent table 300, and then step 708 is executed. At step 708, the value of the present End pointer 302 on the Resident extent table 300 is put into the Back pointer of the vacant entry searched at step 705, and then step 801 (FIG. 8) is executed.

Figure 8:
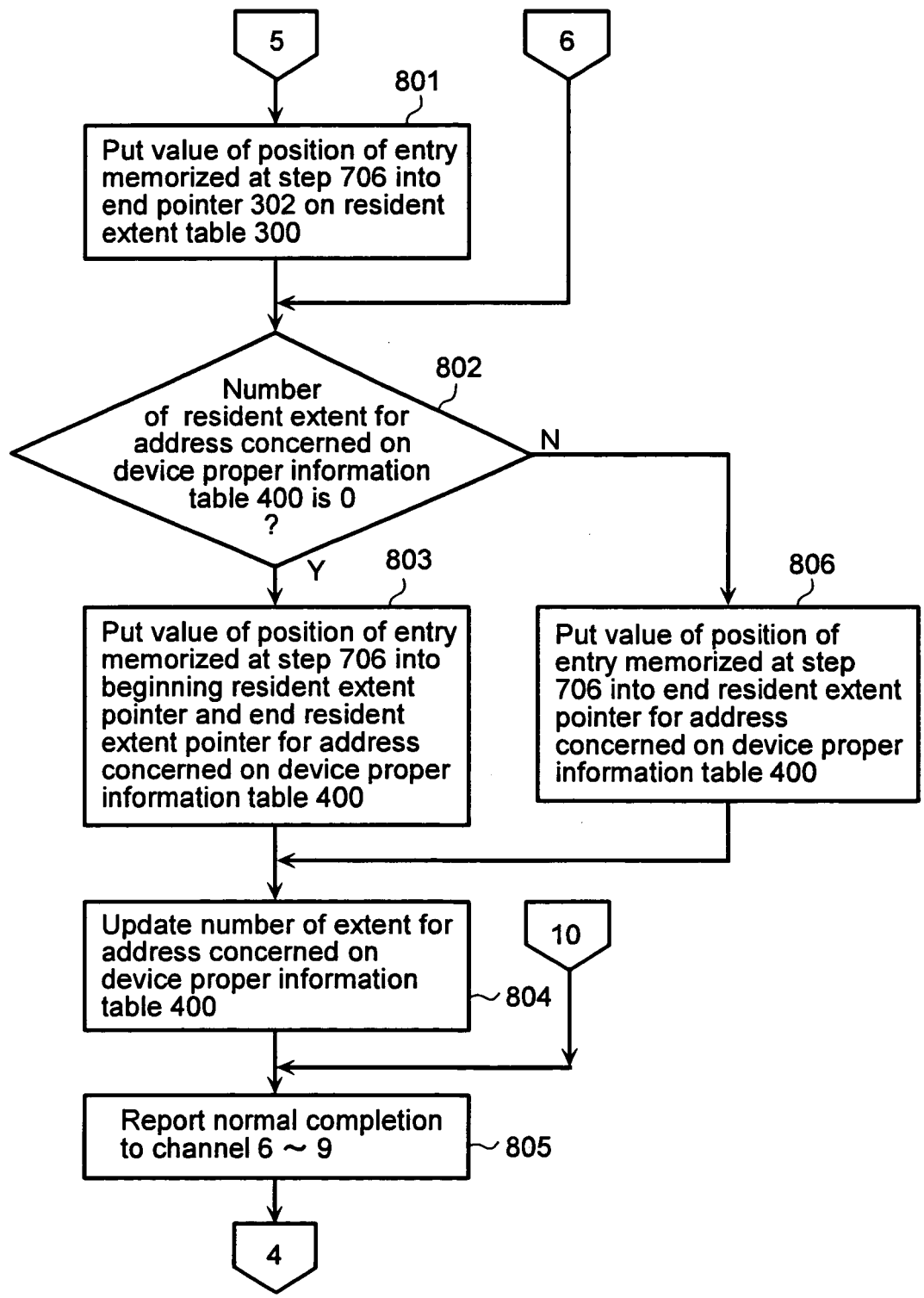

Next, the flow chart shown in FIG. 8 is explained. FIG. 8 shows an example of process flow in processing when the set residing instruction is issued from the utility program 4 or 5. At step 801, the value of the position (pointer) of the entry memorized at step 706 is put into the End pointer 302 on the Resident extent table 300.

A test is performed at step 802 to determine if the Number of resident extent of the address concerned on the Device proper information table 400 is "0". That is to say, this step examines if any resident extent of the address concerned exists. If the Number of resident extent of the address concerned on the Device proper information table 400 is "0", step 803 is executed. If the Number of resident extent of the address concerned on the Device proper information table 400 is not "0", step 806 is executed.

At step 803, the value of the position (pointer) of the entry memorized at step 706 is put into the Beginning resident extent pointer and the End resident extent pointer for the address concerned on the Device proper information table 400, and then step 804 is executed. At step 804, the Number of resident extent for the address concerned on the Device proper information table 400 is updated, and then step 805 is executed. At step 805, the normal completion is reported to the channels o to 9, and the processing is returned to step 501 (FIG. 5).

At step 806, the value of the position (pointer) of the entry memorized at step 706 is put into the End resident extent pointer for the address concerned on the Device proper information table 400, and then step 804 is executed.

Figure 9:
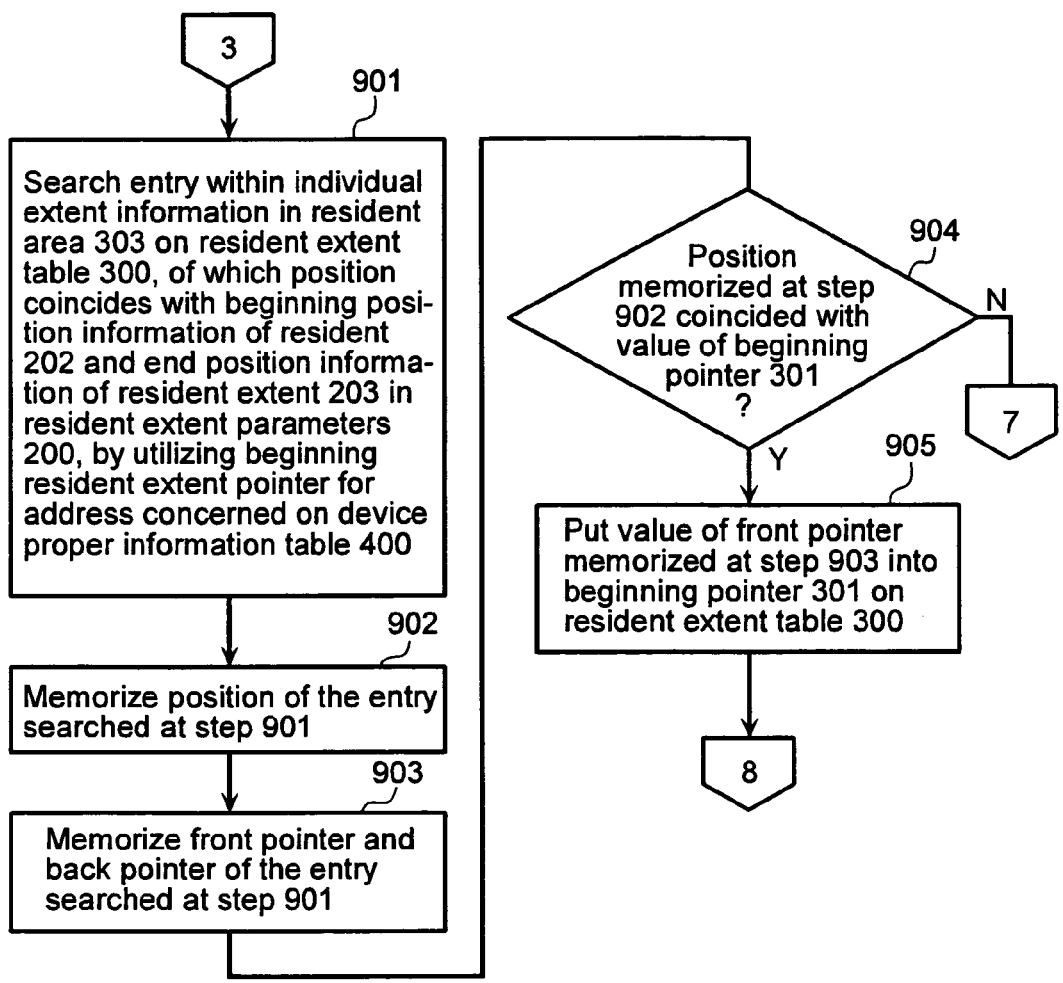

FIG. 9 shows an example of process flow in processing when the reset residing instruction is issued from the utility program 4 or 5. At step 901, an entry, of which the Beginning position information of resident extent 202 and the End position information of resident extent 203 in the Resident extent parameters 200 are coincident, is searched within the Individual extent information in resident area 303 on the Resident extent table 300 by utilizing the Beginning resident extent pointer for the address concerned on the Device proper information table 400, and then step 902 is executed.

At step 902, the position (pointer) of the entry searched at step 901 is memorized, and then step 903 is executed. At step 903, the values of Front pointer and End pointer of the entry searched at step 901 are memorized, and then step 904 is executed.

A test is performed at step 904 to determine if the position (pointer) memorized at step 902 is coincident with the value of the Beginning pointer 301 on the Resident extent table 300. At step 904, if the position (pointer) memorized at step 902 is not coincident with the value of the Beginning pointer 301 on the Resident extent table 300, step 1001 (FIG. 10) is executed. At step 904, if the position (pointer) memorized at step 902 is coincident with the value of the Beginning pointer 301 on the Resident extent table 300, step 905 is executed. At step 905, the value of the Front pointer memorized at step 903 is put into the Beginning pointer 301 on the Resident extent table 300, and then step 1003 (FIG. 10) is executed.

Figure 10:
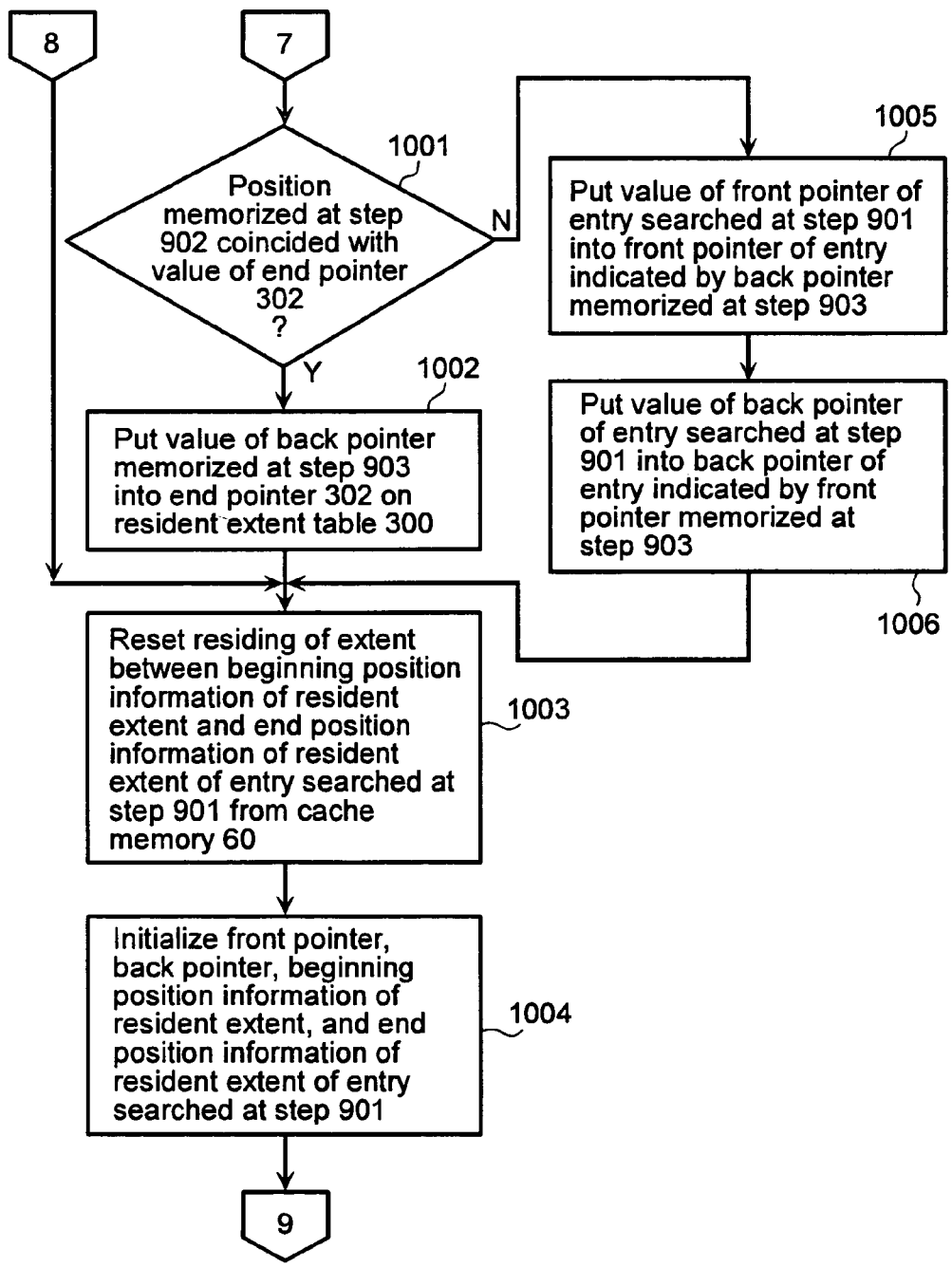

FIG. 10 shows an example of process flow in processing when the reset residing instruction is issued from the utility program 4 or 5. A test is performed at step 1001 to determine if the position (pointer) memorized at step 902 is coincident with the value of the End pointer 302 on the Resident extent table 300. At step 1001, if the position (pointer) memorized at step 902 is not coincident with the value of the End pointer 302 on the Resident extent table 300, step 1005 is executed. At step 1001, if the position (pointer) memorized at step 902 is coincident with the value of the End pointer 302 on the Resident extent table 300, step 1002 is executed.

At step 1002, the value of the Back pointer memorized at step 903 is put into the End pointer 302 on the Resident extent table 300, and then step 1003 is executed. At step 1003, the Reset residing of the extent between the Beginning position information of resident extent and the End position information of resident extent of the entry searched at step 901 from the cache memory 60 is executed, and then step 1004 is executed.

At step 1004, the Front pointer, the Back pointer, the Beginning position information of resident extent, and the End position information of resident extent of the entry searched at step 901, which are in the Individual extent information in resident area 303, are initialized, and then step 1101 (FIG. 11) is executed.

At step 1005, the value of the Front pointer of the entry searched at step 901 in the Individual extent information in resident area 303 is put into the Front pointer of an entry indicated by the Back pointer memorized at step 903, and then step 1006 is executed. At step 1006, the value of the Back pointer of the entry searched at step 901 in the Individual extent information in resident area 303 is put into the back pointer of an entry indicated by the Front pointer memorized at step 903.

Figure 11:
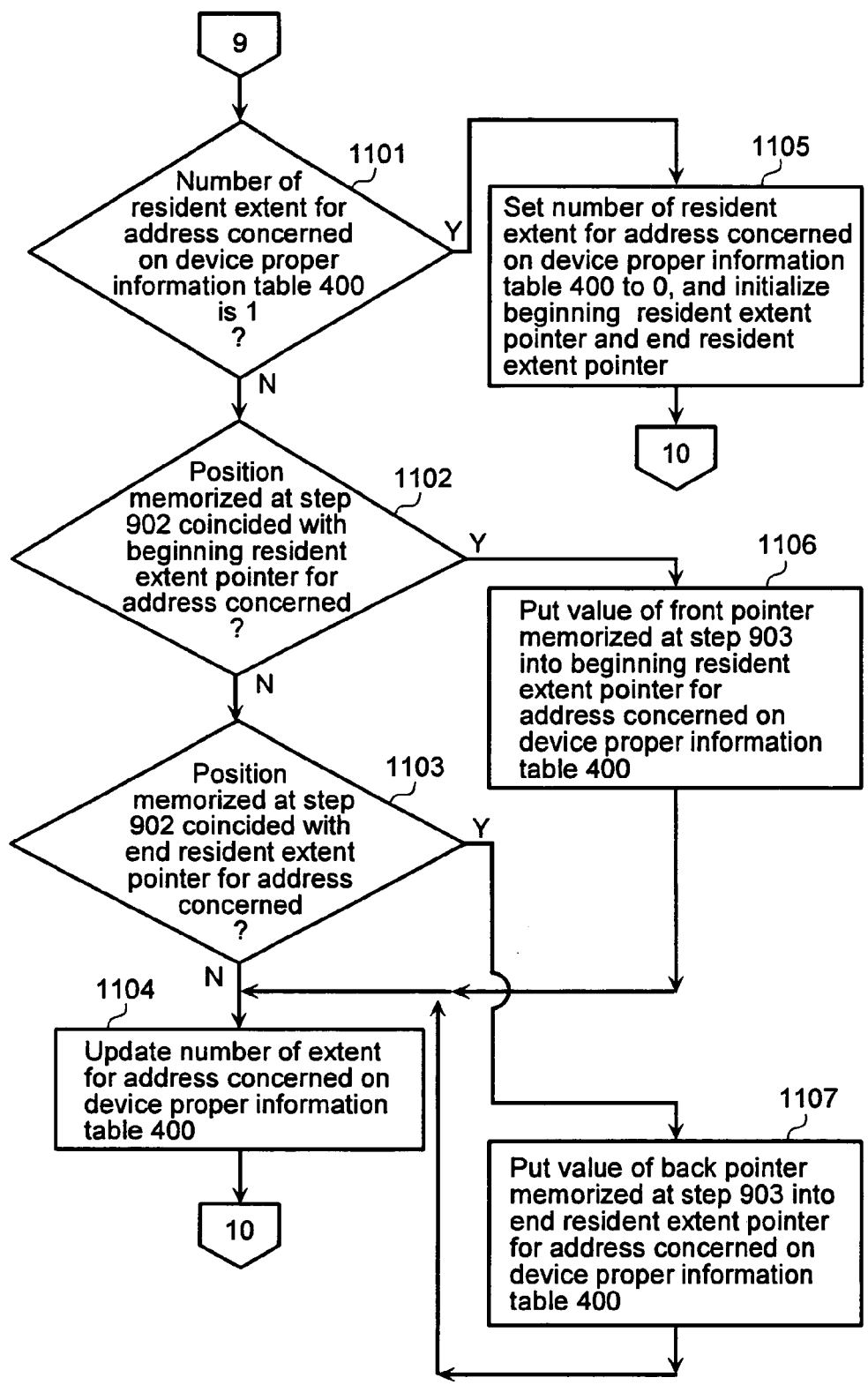

FIG. 11 shows an example of process flow in processing when the reset residing instruction is issued from the utility program 4 or 5. A test is performed at step 1101 to determine if the Number of resident extent for the address concerned on the Device proper information table 400 is "1". At step 1101, if the Number of resident extent for the address concerned on the Device proper information table 400 is "1", step 1105 is executed. At step 1101, if the Number of resident extent for the address concerned on the Device proper information table 400 is not "1", step 1102 is executed.

A test is performed at step 1102 to determine if the value of the position (pointer) of the entry memorized at step 902 is coincident with the value of the Beginning resident extent pointer for the address concerned. At step 1102, if the value of the position (pointer) of the entry memorized at step 902 is coincident with the value of the Beginning resident extent pointer for the address concerned, step 1106 is executed. At step 1102, if the value of the position (pointer) of the entry memorized at step 902 is not coincident with the value of the Beginning resident extent pointer for the address concerned, step 1103 is executed.

A test is performed at step 1103 to determine if the value of the position (pointer) of the entry memorized at step 902 is coincident with the value of the End resident extent pointer for the address concerned. At step 1103, if the value of the position (pointer) of the entry memorized at step 902 is coincident with the value of the End resident extent pointer for the address concerned, step 1107 is executed. At step 1103, if the value of the position (pointer) of the entry memorized at step 902 is not coincident with the value of the End resident extent pointer for the address concerned, step 1104 is executed.

At step 1104, the Number of resident extent for the address concerned on the Device proper information table 400 is updated, and then step 805 (FIG. 8) is executed. At step 1105, the Number of resident extent for the address concerned on the Device proper information table 400 is set to "0", and the Beginning resident extent pointer and the End resident extent pointer are initialized, and then step 805 (FIG. 8) is executed.

At step 1106, the value of the Front pointer memorized at step 903 is put into the Beginning resident extent pointer for the address concerned on the Device proper information table 400, and control goes to step 1104 is executed. At step 1107, the value of the Back pointer memorized at step 903 is put into the End resident extent pointer for the address concerned on the Device proper information table 400, and then step 1104 is executed.

By the present embodiment, using the host utility program 4 or 5, user data spread on plural tracks can be resided in the lump on the cache memory 60 in the disk array subsystem 20; therefore, cache hit rate is increased and the improvement of performance of the information processing system including the host unit can be achieved.

In the present embodiment, though a vacant entry within the Individual extent information in resident area 303 on the Resident extent table 300 is searched, it is clear that the present invention can be applied by a method in which the vacant entry is managed by using information such as a vacant entry pointer and number of vacant entries.

Further, in the present embodiment, the host utility program 4 or 5 on the central processing unit 1 or 2 is running constantly, and the set residing and reset residing of arbitrary data-set on the cache memory 60 in the disk array subsystem 20 can be executed based on the user defined information 91 which is made through the terminal 3 by user and the operating information 92 which is made and used by the operating system; therefore, it is clear that very careful dynamic cache residing corresponding to an operating state of the information processing system can be executed.

In the present embodiment, it is employed that a set residing instruction and a reset residing instruction from the host utility program 4 or 5 on the central processing unit 1 or 2 are received, and the set residing and the reset residing of user data on the cache memory 60 in the disk array subsystem 20 are executed. However, the set residing on the cache memory and the reset residing on the cache memory can be executed also by a method described below.

The service processor 21 has a storage file to store the operating information of the disk array subsystem 20, the operating information of the disk array subsystem 20 is collected in the channel interface control units 31 to 35 and is stored once on the shared memory 50, and then, the operating information of the disk array subsystem 20 stored in the shared memory 50 is reported to the service processor 21 through the bus 41 by the channel interface control units 31 to 35 with constant time intervals.

The operating information of the disk array subsystem 20 reported from the channel interface control units 31 to 35 is stored in the storage file by the service processor 21. Then, the service processor 21 analyzes the operating information of the disk array subsystem 20 in the storage file with constant time intervals and transmits instructions of set residing, reset residing, and information of physical cylinder address, head address, device address, to the channel interface control units 31 to 35 via the bus 41. The channel interface control units 31 to 35 execute the set residing and the reset residing of the user data on the cache memory 60 in the disk array subsystem 20 based on the instructions and information from the service processor 21.

In the present embodiment, the use of two central processing units is shown; however, the present invention can be applied also to a case of one central processing unit or three or more central processing units. Further, in the present embodiment, a structure in which only a central processing unit is connected as processing unit is shown; however, the present invention can be applied also to a structure in which a personal computer and an external storage device are connected, or to a structure in which a central processing unit and a personal computer are connected in shared mode. Namely, though SCSI interface is mainstream of personal computer interface, regardless of kind of interface protocol between the personal computer and the disk array subsystem 20, when the set residing on cache memory instruction and the reset residing on cache memory instruction can be defined on an interface between the personal computer and the disk array subsystem 20 similarly in the present embodiment, and when the set residing on cache memory and the reset residing on cache memory can be instructed to the disk array subsystem 20 from the host utility program 4 or 5 running in the personal computer, the present invention can be applied.

Furthermore, it is clear that, regardless of kind of interface protocol between an upper unit and the disk array subsystem 20, when the set residing on cache memory instruction and the reset residing on cache memory instruction can be defined on an interface between the upper unit and the disk array subsystem 20 similarly in the present embodiment, and when the set residing on cache memory and the reset residing on cache memory can be instructed to the disk array subsystem 20 from the host utility program 4 or 5 running in the upper unit, the present invention can be applied.

In the present embodiment, an example for the external storage subsystem is shown; however it is to be understood that the present invention can be applied to an external storage controller.

By the dynamic cache memory storage method of the present invention, user data spread on plural tracks can be stored in the cache memory; thus increasing the cache hit rate and improving performance of the information processing system. Furthermore, by the dynamic cache memory data control method in the present invention, very careful set residing and reset residing of user data spread on plural tracks can be executed; therefore, the cache hit rate is increased, and improvement of performance of the information processing system is achieved.

The preceding has been a description of the preferred embodiment of the invention. It will be appreciated that deviations and modifications can be made without departing from the scope of the invention, which is defined by the appended claims.

What is claimed is:

1. An external storage system comprising:
a plurality of disk drives for storing data;
a drive interface control unit operatively couple to the disk drives;
a channel interface control unit through which a connection with a supervisory unit can be established for reading and writing data;
a cache memory connected to the drive interface control unit and to the channel interface control unit, the cache memory for temporarily storing data between the disk interface control unit and the channel interface control unit; and
a shared memory connected to the drive interface control unit and to the channel interface control unit, the shared memory for storing information relating to data that is to be staged to the cache memory,
the information being used by the channel interface control unit to stage data that is stored in a plurality of tracks in one or more of the disk drives to the cache memory by way of the drive interface control unit,
the information further being used by the channel interface control unit to destage data from the cache memory to be stored to the disk drives by way of the drive interface control unit,
wherein staging of the data to the cache memory and destaging of the data from the cache memory are performed according to staging and destaging instructions from the supervisory unit, the instructions formulated by the supervisory unit according to criteria provided by a user.

2. The external storage system as claimed in claim 1, in which the staging in or destaging from the cache memory of the user data is executed in a processing unit of a data-set domain.

3. The external storage system as claimed in claim 1, in which the staging or destaging of the data are performed for a data-set domain.

4. The external storage system as claimed in claim 1, in which the information includes a data-set name which is entered by a user.

5. An information processing system having an external storage system and a host unit which is external to the external storage system and connected to the external storage system, in which the external storage system comprises a plurality of disk drives, a drive interface control unit, a channel interface control unit, a shared memory, and a cache memory, in which the host unit executes writing and reading data to the external storage system, and in which
the host unit has a host utility program to manage data in the cache memory, and user defined information or operating information of the external storage system for execution of the host utility program,
wherein the host utility program can issue a resident command to instruct the channel interface control unit to set residing data in the cache memory, and can issue a reset command to instruct the channel interface control unit to reset residing data in the cache memory,
wherein the channel interface unit in the external storage system receives the resident command and the reset command based on the user defined information or the operating information,
wherein the drive interface control unit is operable to store data on the disk drives,
wherein the cache memory is in data communication with the drive interface control unit and the channel interface control unit,
wherein the shared memory is in data communication with the drive interface control unit and the channel interface control unit, and stores first information relating to data stored in the cache memory,
wherein the channel interface control unit sets and resets residing data in the cache based on the first information.

6. The information processing system as claimed in claim 5, in which the residing data is set or reset in the cache memory in units of data-set domains.

7. The information processing system as claimed in claim 5, in which the user defined information includes a data-set name which is entered from a terminal connected to the host unit.

8. A system comprising a host unit and a disk array system separate from the host unit and in data communication therewith, the disk array system comprising:

a plurality of disk drives for storing data;

a drive interface control unit operably coupled to the disk drives for transfer of data therewith;

a channel interface control unit to receive data transfer commands from a host unit;

a cache memory in data communication with channel interface control unit and with the drive interface control unit; and a shared memory in data communication with channel interface control unit and with the drive interface control unit, the shared memory having stored therein first information relating to data staged in the cache, wherein the host unit can issue a resident command and a reset command;

wherein in response to receiving a resident command from the host unit, the channel interface control unit accesses the first information to store data received from disk drives into the cache memory, wherein in response to receiving a reset command from the host unit, the channel interface control unit accesses the first information to reset data that is stored in the cache memory.

9. The system as claimed in claim 8, in which the data is a data-set domain.

10. The system as claimed in claim 8, in which the first information includes a data-set name that is provided by a user.

* * * * *